(12) United States Patent  (10) Patent No.: US 9,363,155 B1
Gravino et al.  (45) Date of Patent: Jun. 7, 2016

(54) AUTOMATED AUDIENCE RECOGNITION FOR TARGETED MIXED-GROUP CONTENT

(71) Applicant: Cox Communications, Inc., Atlanta, GA (US)

(72) Inventors: Douglas D. Gravino, Roswell, GA (US); Ryan M. S. Baker, Lilburn, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 308 days.

(21) Appl. No.: 13/900,317

(22) Filed: May 22, 2013

Related U.S. Application Data

(60) Provisional application No. 61/783,992, filed on Mar. 14, 2013.

(51) Int. Cl.
*G06F 15/16* (2006.01)
*H04L 12/26* (2006.01)
(52) U.S. Cl.
CPC ...................................... *H04L 43/08* (2013.01)
(58) Field of Classification Search
CPC .......................... H04L 65/4084; H04L 67/306

USPC .................................................. 709/223, 224
See application file for complete search history.

(56) References Cited

U.S. PATENT DOCUMENTS

2013/0174273 A1* 7/2013 Grab et al. ...................... 726/28
2013/0262365 A1* 10/2013 Dolbear et al. .................. 706/47

OTHER PUBLICATIONS

Tibken, Shara, Feb. 12, 2013, "Intel confirms it's building an Internet TV service and box", retrieved on May 21, 2013 from http://news.cnet.com/8301-1023_3-57568955-93/intel-confirms-its-building-an-internet-tv-service-and-box, 8 pages.

* cited by examiner

*Primary Examiner* — Adnan Mirza
(74) *Attorney, Agent, or Firm* — Merchant & Gould

(57) ABSTRACT

Non-intrusive user identification to provide personalized media content is provided. Using one or more sensors, a user or a combination of users may be identified. If the user or combination of users is known, user information may be retrieved and rules may be applied for providing content personalized to the identified person or group of people. User behavior may be monitored and changes in the audience composition may be monitored so that personalized content may be adjusted accordingly.

20 Claims, 5 Drawing Sheets

AUTOMATED AUDIENCE RECOGNITION FOR TARGETED MIXED-GROUP CONTENT

CROSS REFERENCE TO RELATED APPLICATIONS

The present application claims priority to U.S. Provisional Patent Application No. 61/783,992 titled "Automated Audience Recognition for Targeted Mixed-Group Content" filed Mar. 14, 2013, the disclosure of which is hereby incorporated by reference in its entirety.

BACKGROUND

Oftentimes, television viewing and many other forms of content consumption in the home or other places are communal activities. On the other hand, most personalization and recommendation systems designed for video are designed for individual users. For example, if a household has a set-top box that allows individual user login for personalized recommendations, typically only one user is allowed to be signed in at a given time, regardless of which other family members may happen to be in the room watching TV. If an adult is logged in but a child is also in the room, the adult's viewership records could have children's programming associated with it, which may later produce incorrect recommendations for children's programming when the adult is watching TV alone. Similarly, if the adult is logged in and a child is in the room, the recommendation platform may suggest more mature content that may be inappropriate for a younger viewer.

A problem may also exist where, if a user logs in, circumstances may change while personalized content is being provided to the user. For example, the user may leave the room and another user may watch video content. Current systems may not be able to determine that the viewing audience has changed and may continue to provide recommended and/or personalized content for the first user.

Without a simplistic, seamless identification system, users may be highly unlikely to manually identify themselves to a system prior to consuming content. Presently, users tend to log into their video or other content service with an individual ID and use the service in a communal manner, oftentimes resulting in inconsistent and inaccurate recommendations.

It is with respect to these and other considerations that the present invention has been made.

SUMMARY

Embodiments of the present invention provide a non-intrusive user identification system. This invention seeks to assuage the "login problem" by automatically monitoring an audience and identifying individual participants to inform a content delivery system or personalization system as to which particular mixture of users, both unknown and known, may be present.

The system could use a variety of devices to specifically or generally identify participants, and then associate them with login-specific information such as their viewing history, usage habits and patterns, preferred types and sources of content, and account information, or with generic preferences known for certain demographics.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

Referring now to the drawings in which like reference numbers represent corresponding parts throughout.

DETAILED DESCRIPTION

Figure 1:
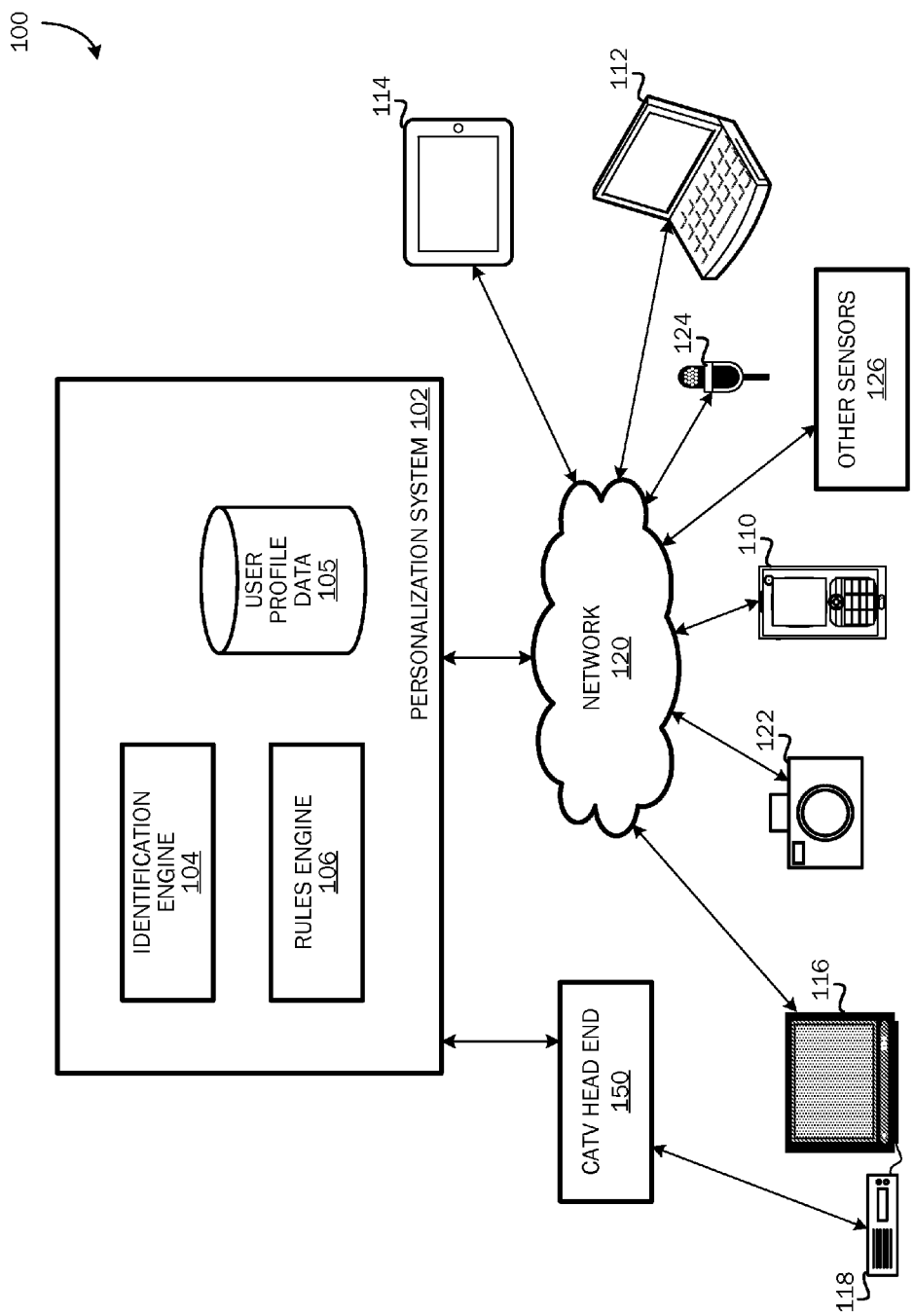
FIG. 1 is a simplified block diagram illustrating a system for providing personalized content based on presence.

Embodiments provide for an automatic detection of a user or group of users and providing personalized content based on presence information. These embodiments may be combined, other embodiments may be utilized, and structural changes may be made without departing from the spirit or scope of the present invention. The following detailed description is therefore not to be taken in a limiting sense. Referring now to the drawings, in which like numerals refer to like elements throughout the several figures, embodiments of the present invention and an exemplary operating environment will be described.

Although the embodiments described herein focus on a use for video content recommendations and video-related preferences in a living-room environment, embodiments may also be used for other media content types in other media consumption environments. For example, embodiments may be utilized for automatically choosing music for family members who are in a car, choosing photos of friends to display at a party depending on which friends are attending, etc.

Referring now to FIG. 1, a simplified block diagram illustrating a system 100 for providing personalized content based on presence is shown. The system 100 may comprise one or more endpoint devices such as, but not limited to, a mobile communication device 110, a desktop or laptop computer 112, a tablet computing device 114 or other wireless device, an Internet television 116, or a television 116 connected to a networked device such as a set top box (STB) 118. The one or more endpoint devices may be operable to receive content, such as video content, audio content, etc.

The system 100 may comprise a personalization system 102. According to embodiments, the personalization system 102 may receive identification information of a person or a group of persons in an environment. Identification information may include, for example, two-dimensional (2D) or three-dimensional (3D) imaging, voice data, weight and/or stride length data, data from an radio frequency identification (RFID) tag, identification data of a mobile phone 110 or other personal portable computing device (e.g., a tablet 114, laptop computer 112, etc.). The identification information may be detected by one or more sensors. The one or more sensors may include a camera 122, a microphone 124, a pressure sensitive pad, an RFID system, a GPS, cellular triangulation, wireless network triangulation, local device associations, an application, or other sensor 126. A sensor may be an independent device, or may be integrated with other components (e.g., a set top box (STB) 118, a television 116, a mobile phone 110, a computer 112, a tablet computing device 114, etc). For example, 2D or 3D imaging, which may include visual or thermal imaging, may be provided by a camera 122. The camera 122 may be visual or thermal, and may be an independent device or may be integrated with another component. Voice data may be provided by a microphone 124, and weight and/or stride length data may be detected by a pressure sensitive pad.

One or more components of the personalization system 102 may be network-based, wherein identification information may be provided to the personalization system 102 via a network 120, such as the Internet or a hybrid fiber coax (HFC) network. According to an embodiment, the components of the personalization system 102 may be centralized as illustrated in FIG. 1; alternatively, one or more components of the personalization system 102 may be decentralized and may communicate over a network 120.

The personalization system 102 may include an identification engine 104 operable to determine a person or a group of people according to the identification information detected by the one or more sensors 122,124,126. Although illustrated as located remotely over a network 120, alternatively, the identification engine 104 may be locally based. Certain types of identification, such as geo-location by network triangulation for mobile devices 110, may be passive and network-based with standard location software and systems.

Individualized, personalized information associated with a person or a group of people may be stored in a user profile database 105. The individualized, personalized information may include personalizations, preferences, demographics, etc., for one or more people. User profile data may be retrieved for a person or a group of people identified by the identification engine 104.

The personalization system 102 may also include a rules engine 106 operable to apply personalization rules for providing content specific to the identified person or group of people. Existing individual or group preferences may be blended and prioritized via the rules engine 106 to create a group preference specifically for the mixture of people in the environment. The rules engine 106 may also be operable to apply safety rules to assure that certain content viewership or personalizations may not be allowed to occur. For example, if adult-type video content is being provided, and a child is identified as being present, a safety rule may be applied, wherein the adult-type video content may cease to be provided until the child is no longer detected in the environment. The rules engine 106 may be similar to existing server-based rules engines used for personalization, recommendation, etc., but may include enhancements to the rules algorithms to take into account complexities of multiple and changing simultaneous users. The rules may be a combination of system-defined rules (e.g., "never show adult content if a child is in the room"), user-defined rules defined via a user interface (e.g., web-based, STB-based, or application-based on a mobile device 110, tablet 114, etc.), or learned by watching user behavior (e.g., when a parent and a child are in a room, 80% of the time, children's programming is watched, so recommend 80% children's programming").

Figure 2:
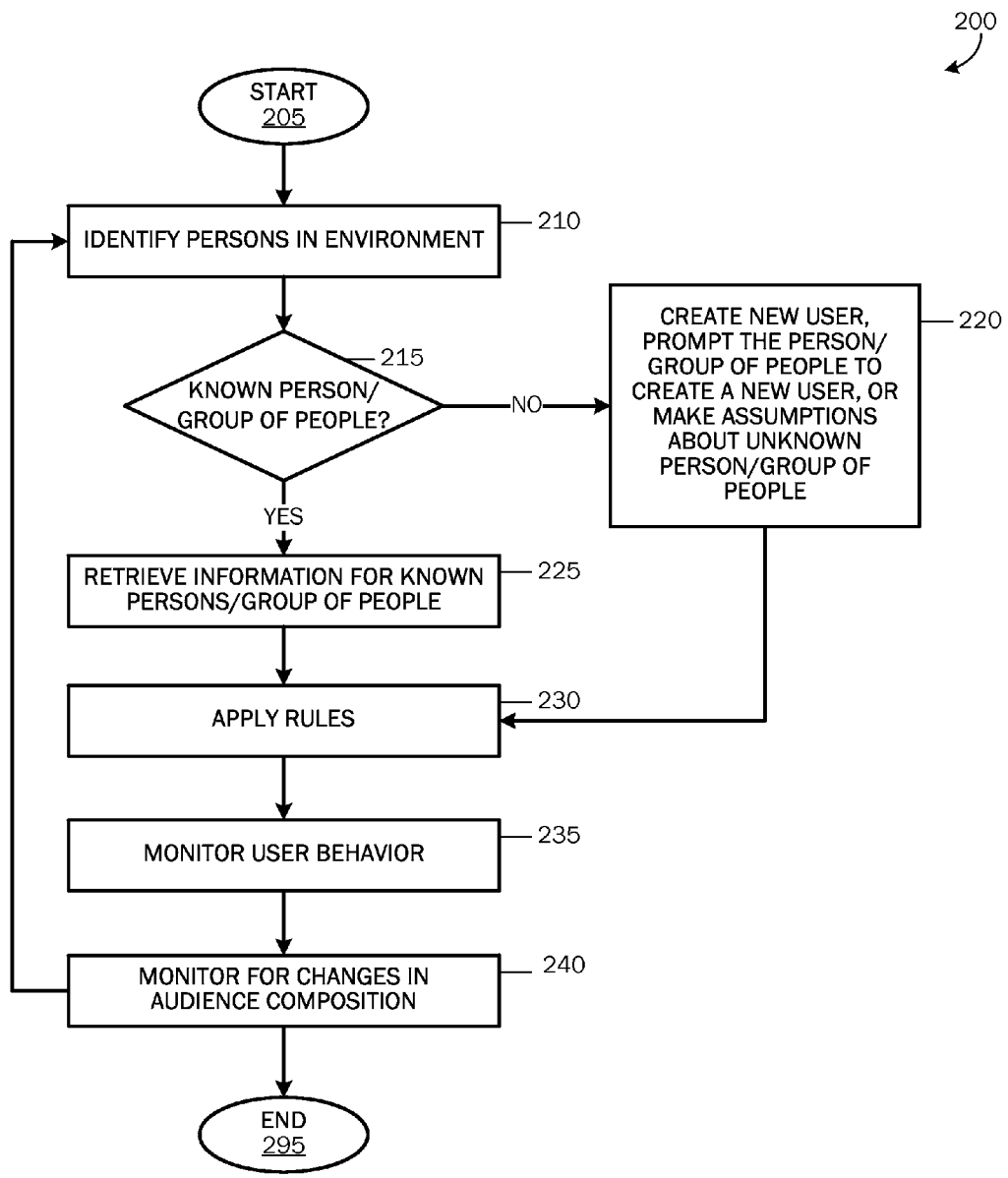
FIG. 2 is a flow chart of a method for automatically providing personalized content based on presence according to an embodiment.

Having described a system architecture 100, FIG. 2 is a flow chart of a method for automatically providing personalized content based on presence according to an embodiment. The method 200 may begin at START OPERATION 205, and may proceed to OPERATION 210, where a person or a group of people may be identified in an environment. OPERATION 210 may be performed by a variety of methods. According to one embodiment, users may manually identify themselves when they enter or leave an area. According to another embodiment, automated methods for identifying users in a room may be performed and may include one or a combination of the following methods (though those "skilled in the art" will recognize many other methods are possible):

Facial recognition, movement recognition, or body recognition by use of a 2D or 3D imaging camera(s) (visual or thermal) 122;

Voice recognition by means of a microphone 124;

Pressure sensitive pads to identify persons by weight, stride length, etc. while walking around a room;

Wearable RF ID chips or other passive RF systems (with appropriate badge readers in an area);

Knowledge of a mobile phone 110 or other personal portable devices in the environment (such as tablets 114) either via location services (GPS, cellular triangulation, wireless local area network (e.g., WiFi) triangulation, etc.) or local device associations (Bluetooth®, wireless local area network hotspot associations, etc.). Note that this method may or may not involve an application on the device.

According to an embodiment, a user's mobile phone 110 or other personal portable device (e.g., tablet 114) being within range of a low-power WiFi hotspot, Bluetooth® unit, etc. embedded in a STB 118 or other quasi-permanent device in a room may provide identification information either from the quasi-permanent device itself or via an application on the device that may report back location information. Identification of a user may comprise certainty thresholds to prevent or allow certain content. For example, a low certainty identification of a child from a single sensor may stop adult-rated content from being provided, whereas a higher certainty from multiple sensors 122,124,126 may be required to start adult-rated content.

According to an embodiment, a learning process step may be performed. For example, a facial recognition system might associate a viewed person to a specific login account for which the system records personalization preferences. The same login account may also be associated with a mobile device 110 or voice recognition profile as well to better verify a person and to provide positive identification under variable conditions (e.g., a user is wearing a hat, forgets his phone, or has a cold producing a raspy voice). The system may also provide for dynamic biometric-associated data, for example, normal growth in children over time, weight gain or weight loss, etc. A recording of who is in an environment at all times or at regular intervals in a database may also be performed at OPERATION 210. This data may be used later by systems, for example, to tailor advertisements, etc., to who is in a room at a given time.

The method 200 proceeds to DECISION OPERATION 215, where a determination may be made as to whether those who are identified at OPERATION 210 is/are a known person or group of people. If unknown persons are detected in the environment, at OPERATION 220, this information may be used by the personalization system 102 to automatically create new users or to prompt the user whether there is a new person for whom a profile should be created. Alternatively, the information may be passed to the personalization system 102 to be used in a general manner. If unknown persons are detected in a room, the system may have a set of defaults for certain user types. For example, if the voice recognition system detects the voice of what is determined to be an unknown child, the system may use a generic "child" profile to make child-friendly personalization for as long as the child is detected to be in the room.

If those who are identified at OPERATION 210 is/are a known person or group of people, the method 200 may proceed to OPERATION 225, where individual information for the known person or group of people may be retrieved. According to an embodiment, OPERATION 225 may comprise a retrieval of personalization data, preference data, viewing history data, demographic data, etc. for the known individuals identified in a room so that those profiles can be blended together in the next step. It is also possible that for certain combinations of persons, their typical group behavior is different from a combination of their individual behaviors, in which case the system may also retrieve personalization data, preference data, viewing history data, demographic data, etc. that is unique to the grouping of individuals.

At OPERATION 230, prioritization, "blending", and/or "safety" rules based on the composition of the audience may be applied, and personalization (recommendations, advertisements, set preferences, content display, etc.) may be made. OPERATION 230 may comprise blending and prioritizing existing individual or group preferences (i.e., user profile data stored in a user profile database 105) via a rules engine 106 to create a group preference specifically for the mixture of persons in a room. This blending and prioritization may take many forms and have many uses. For example, when providing video recommendations, the following rules may be applied:

Recommend only content from genres that all people in the room like;
Recommend only television shows if one person in the room has not seen the episode yet and another person rated it at least 4 of 5 stars;
Recommend only movies that no one in a room has seen;
If multiple adults are in a room, weigh both sets of viewing preferences equally;
If a child and parent are in a room, only recommend age appropriate content and use an 80/20 weight of the child's and parent's viewing preferences;
If multiple children are in a room, set the minimum content rating to that of the youngest child and weigh each child's preferences equally.

Although the above examples relate to video recommendations, similar rules may be created and applied for other types of personalizations. For example:

If just one person is in a room, display new incoming text messages, etc. in a banner at the bottom of a television 116 screen. If two people are in the room, only display messages received from a "Work" contact list;
If the system tracks favorite channels for set-top boxes 118 on a per-person basis, display a consolidated list of favorite channels based on everyone in the room;
If multiple people are in a room, only display new social media postings where the person posting is a "friend" of everyone in the room;
When playing music, do not play a track that anyone in the room has rated only "one star";
When displaying photos in a slideshow on a television 116 at a party, only display the photos of people in the room.

OPERATION 230 may also include applying system or user-definable "safety" rules to assure that certain content viewership or personalizations are not allowed to occur. For example, an obvious use may be associated with viewing adult-type video content. A "safety" rule may be applied to ensure that if a child enters into a room where adult-type video content is being displayed, the content may cease to be provided upon detection of the child.

OPERATION 230 may also include a number of potential uses from an advertising perspective. Knowing what people/ demographics are in the room may allow advertising to be more relevant and personalized. For example, an ad-insertion system may query the database of the persons that are in the room and choose an applicable commercial to show to the exact people in the room. For example, an applicable ad might be for a family vacation if the entire family is in the room, whereas if just adults are in the room, a political advertisement may be shown. Furthermore, from an advertising perspective, if the persons in the room are known, even for non-targeted generic ads, a service provider may be able to provide feedback to advertisers of exactly which persons or demographic groups have seen a particular ad.

The method 200 may proceed to OPERATION 235, where user behavior in a group environment that may influence future personalization may be monitored and fed back to the personalization system 102 as either group behavior or potentially separable instances of individual-specific behavior. Monitoring user behavior in a group setting may be performed to get feedback on personalizations for the purpose of either looking for group-specific behavior or for deconstructing group behavior into individual behavior. This feedback may consist of observing what video/music/etc. content has been selected or consumed, ratings assigned by the group to particular pieces of content (e.g., "3 of 5 stars", etc.) after it has been consumed, changes in personalization settings, or other observed feedback of the group's satisfaction/dissatisfaction.

It may be possible that the types of content users may like when together as a group may be different than the simple blending of individual behaviors. For example, the group may have a dominant member who exerts more control over content choices than others. Or the group may only exhibit preferences for certain content on "poker night" that users might not watch at other times. Alternatively, certain behavior in a group setting may have some individual relevance as well. For example, if a video recommendation system were to track what movies a person has watched (so as to not recommend things that have already been seen), group viewership of a movie may count as having seen the movie. Accordingly, the system 102 may track such information.

The method 200 may proceed to OPERATION 240, where changes in the audience composition may be monitored such that personalization changes can be made. OPERATION 240 may be performed on a continuous or as-needed basis to adjust the system 102 to changes in audience composition such as when a person enters or leaves a room. The system 102 may comprise a minimum time or timeout value to ensure that actions, such as people briefly leaving the room (e.g. to get a snack) or only briefly being in the room (e.g. passing through the living room on their way out the front door), do not adversely factor into personalizations. The method 200 ends at OPERATION 295.

Embodiments may be implemented in a number of ways. Identification (OPERATION 210) or monitoring (OPERATIONS 235,240) may be locally or remotely based. For example, cameras 122 for facial-recognition, the microphones 124 for voice recognition, etc. may be local to a user's environment; however, the intelligence for determining which person a sensor has identified may be located remotely over a network 120 in a centralized set of servers. These sensors may either be independent devices or integrated with other component such as a set-top box 118, TV 116, mobile device 110, laptop 112, tablet 114, etc. Certain types of identification, such as geo-location by network triangulation for mobile devices, may be passive and network-based with standard location software and systems.

A network 120 may be used to connect the sensors 122, 124,126 used for identification in OPERATION 210 to the system 102 used in OPERATION 225 to retrieve the individualized, personalized information for the identified persons (or generic user profiles for unknown persons). This retrieval system may be a database 105, though it may also be part of a larger system used for the management and storage of personalized preferences, likes and dislikes, or other individualized (or group) data.

OPERATION 235 may be implemented by commonly available systems that observe user behavior of a specific content type. For example, when providing video recommendations, a system may record various information, such as what video content items a user watches, for how long he watches the content items, etc., and may analyze how actual behavior matches up with predicted behavior. This type of monitoring may be performed and stored for billing purposes in the case of purchased video content, set-top box 118 or head-end 150 logging for linear TV content, for billing disputes, etc. For example, if a customer disputes a purchase of certain content, monitoring information may be provided to determine what users may have been in a room when the content was consumed. The stored information may include records of user identities, degrees of certainty, time/date stamp data, etc. According to one embodiment, actual video, audio, or photos related to user identification/behavior may not be stored.

As can be appreciated, many other implementations may be possible. The system 102 may be almost entirely centralized and network-based aside from the in-room sensors 122, 124,126. Alternatively, the system 102 may be decentralized with only a few "common" pieces at a centralized location. The entire system may be self-contained within a single personalization service provider, although certain elements may be shareable between service providers assuming that standards are defined for the interchange of relevant information.

Figure 3:
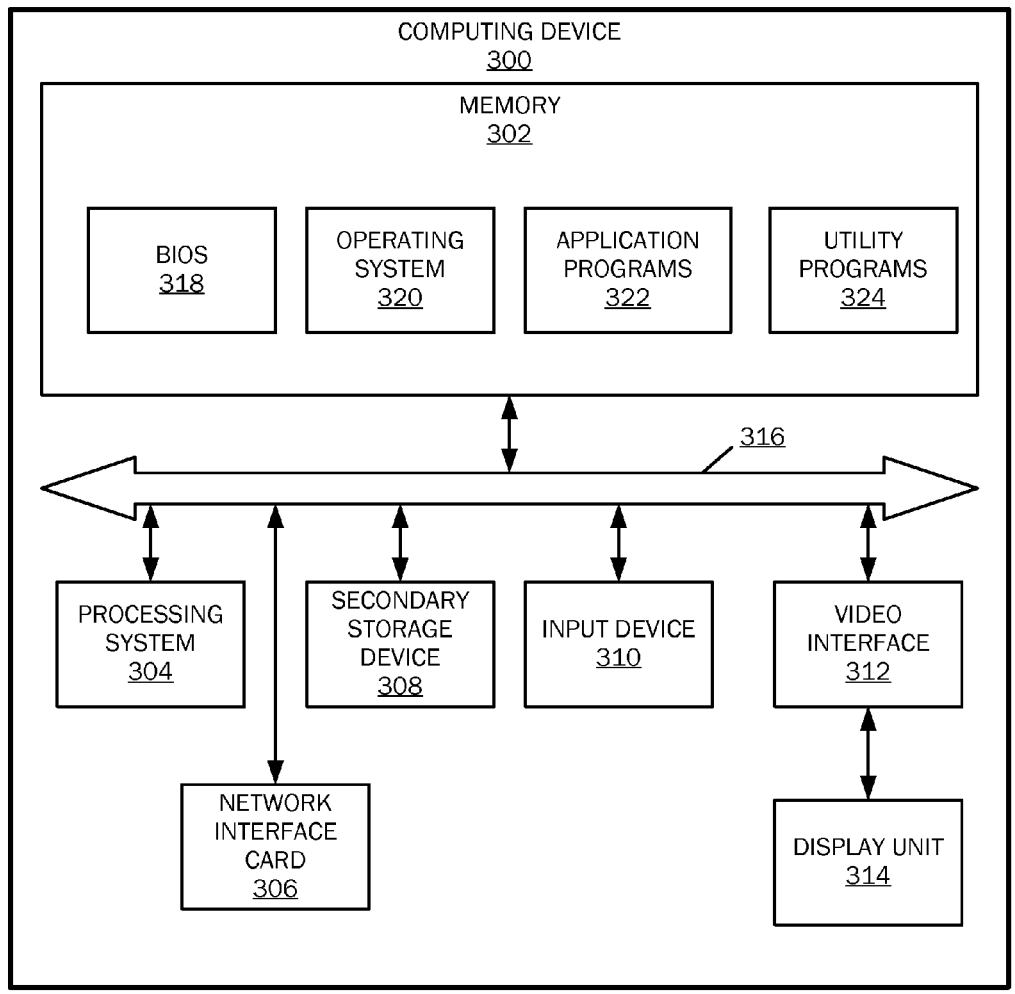
FIG. 3 is a block diagram illustrating example physical components of a computing device with which embodiments may be practiced.

FIG. 3 is a block diagram illustrating example physical components of a computing device 300 with which embodiments may be practiced. In some embodiments, one or a combination of the components of the personalization system 102 may be implemented using one or more computing devices like the computing device 300. It should be appreciated that in other embodiments, one or a combination of the components of the personalization system 102 may be implemented using computing devices having hardware components other than those illustrated in the example of FIG. 3.

Computing devices may be implemented in different ways in different embodiments. For instance, in the example of FIG. 3, the computing device includes a processing system 304, memory 302, a network interface 306, a secondary storage device 308, an input device 310, a video interface 312, a display unit 314, and a communication medium 316. In other embodiments, the computing device 300 may be implemented using more or fewer hardware components (e.g., a video interface, a display unit, or an input device) or in combination with other types of computer systems and program modules. The memory 302 includes one or more computer-readable media. According to one embodiment, the personalization system 102 may be stored locally on computing device 300. Memory 302 thus may store the computer-executable instructions that, when executed by processor 304, provide personalized content based on presence as described above with reference to FIGS. 1-2.

In various embodiments, the memory 302 is implemented in various ways. For example, the memory 302 can be implemented as various types of computer-readable media. According to embodiments, the term computer-readable media includes two different types of media including communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The processing system 304 includes one or more processing units, which may include tangible integrated circuits that selectively execute computer-executable instructions. In various embodiments, the processing units in the processing system 304 are implemented in various ways. For example, the processing units in the processing system 304 can be implemented as one or more processing cores. In this example, the processing system 304 can comprise one or more Intel Core microprocessors. In another example, the processing system 304 can comprise one or more separate microprocessors. In yet another example embodiment, the processing system 304 can comprise Application-Specific Integrated Circuits (ASICs) that provide specific functionality. In yet another example, the processing system 304 provides specific functionality by using an ASIC and by executing computer-executable instructions.

The computing device 300 may be enabled to send data to and receive data from a communication network via a network interface card 306. In different embodiments, the network interface card 306 is implemented in different ways, such as an Ethernet interface, a token-ring network interface, a fiber optic network interface, a wireless network interface (e.g., WiFi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 308 includes one or more computer-readable storage media, and may store data and computer-executable instructions not directly accessible by the processing system 304. That is, the processing system 304 performs an I/O operation to retrieve data and/or computer-executable instructions from the secondary storage device 308. In various embodiments, the secondary storage device 308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 310 enables the computing device 300 to receive input from a user. Example types of input devices include, but are not limited to, keyboards, mice, trackballs, stylus input devices, key pads, microphones, joysticks, touch-sensitive display screens, and other types of devices that provide user input to the computing device 300.

The video interface 312 outputs video information to the display unit 314. In different embodiments, the video interface 312 is implemented in different ways. For example, the video interface 312 is a video expansion card. In another example, the video interface 312 is integrated into a motherboard of the computing device 300. In various embodiments, the display unit 314 can be a an LCD display panel, a touch-sensitive display panel, an LED screen, a projector, a cathode-ray tube display, or another type of display unit. In various embodiments, the video interface 312 communicates with the display unit 314 in various ways. For example, the video interface 312 can communicate with the display unit 314 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 316 facilitates communication among the hardware components of the computing device 300. In different embodiments, the communications medium 316 facilitates communication among different components of the computing device 300. For instance, in the example of FIG. 3, the communications medium 316 facilitates communication among the memory 302, the processing system 304, the network interface card 306, the secondary storage device 308, the input device 310, and the video interface 312. In different embodiments, the communications medium 316 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318, and an operating system 320. The BIOS 318 includes a set of software instructions that, when executed by the processing system 304, cause the computing device 300 to boot up. The operating system 320 includes a set of software instructions that, when executed by the processing system 304, cause the computing device 300 to provide an operating system that coordinates the activities and sharing of resources of the computing device 300. The memory 302 also stores one or more application programs 322 that, when executed by the processing system 304, cause the computing device 300 to provide applications to users, for example, one or more components of the personalization system 102. The memory 302 also stores one or more utility programs 324 that, when executed by the processing system 304, cause the computing device 300 to provide utilities to other software programs. Embodiments of the present invention may be utilized in various distributed computing environments where tasks are performed by remote processing devices that are linked through a communications network in a distributed computing environment.

Figures 4A, 4B:
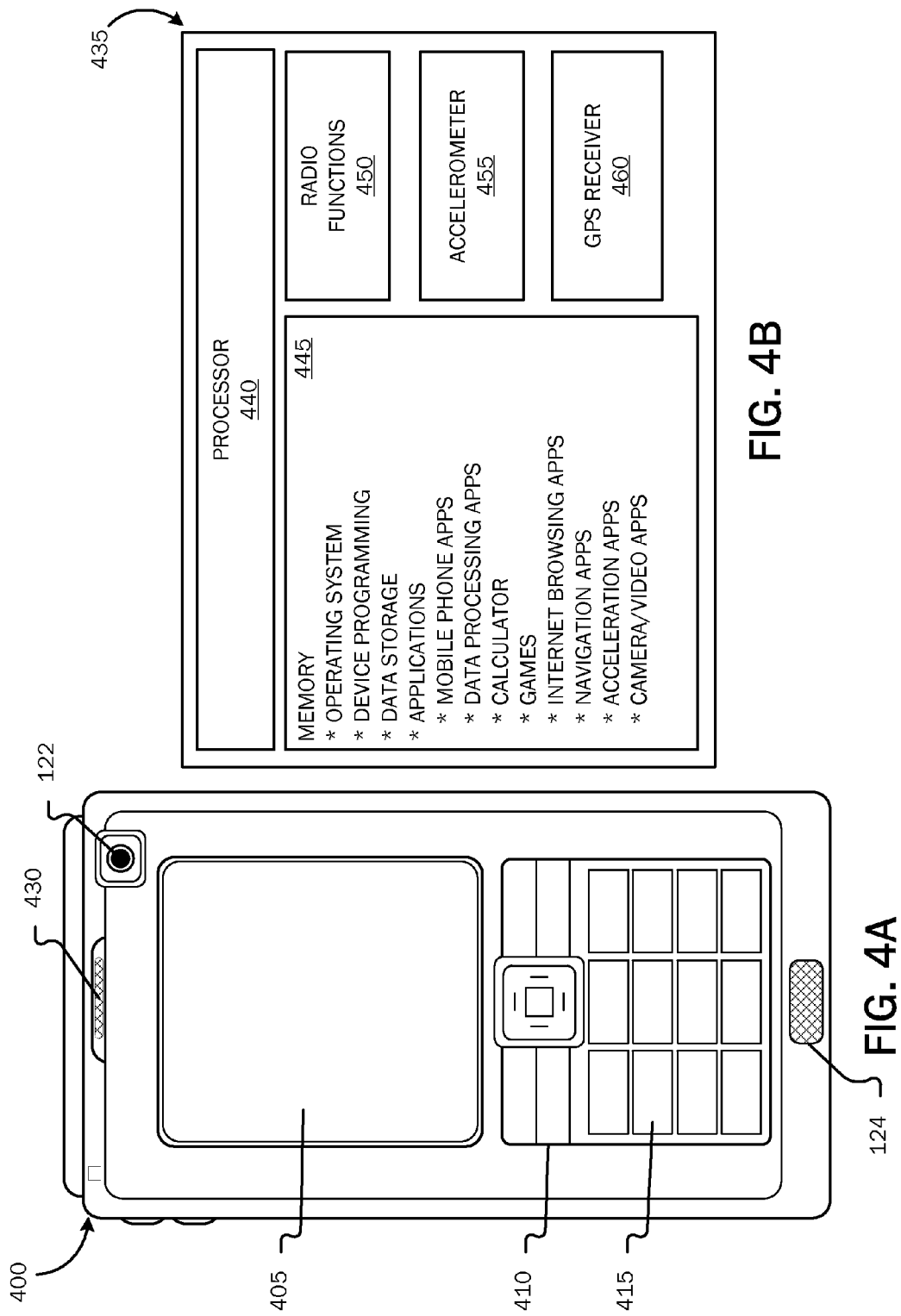
FIGS. 4A-4B illustrate a suitable mobile computing environment with which embodiments may be practiced.

FIGS. 4A-4B illustrate a suitable mobile computing environment, for example, a mobile computing device 400, a mobile phone 110, a tablet personal computer 114, a laptop computer 112, and the like, with which embodiments may be practiced. The mobile computing device 400 is illustrative of any suitable device operative to send, receive and process wireless communications according to embodiments of the present invention. A display screen 405 is operative for displaying a variety of information such as information about incoming and outgoing communications, as well as, a variety of data and displayable objects, for example, text, alphanumeric data, photographs, and the like.

Data input to the device 400 may be performed via a variety of suitable means, such as, touch screen input via the display screen 405, keyboard or keypad input via a data entry area 410, key input via one or more selectable buttons or controls 415, voice input via a microphone 124 disposed on the device 400, photographic input via a camera 122 functionality associated with the mobile computing device, or any other suitable input means. Data may be output via the device 400 via any suitable output means, including but not limited to, display on the display screen 405, audible output via an associated speaker 430 or connected earphone system, vibration module for providing tactile output, and the like.

Referring now to FIG. 4B, operational unit 435 is illustrative of internal operating functionality of the mobile computing device 400. A processor 440 is illustrative of a general purpose computer processor for processing incoming and outgoing data and communications and controlling operation of the device and associated software applications via a mobile computing device operating system. Memory 445 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of the personalization system 102 may be stored locally on mobile computing device 400.

Mobile computing device 400 may contain an accelerometer 455 for detecting acceleration, and can be used to sense orientation, vibration, and/or shock. Mobile computing device 400 may contain a global positioning system (GPS) receiver (e.g., GPS send/receive functionality) 460. A GPS system uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 450 include all required functionality, including onboard antennae, for allowing the device 400 to communicate with other communication devices and systems via a wireless network. Radio functions 450 may be utilized to communicate with a wireless or WiFi-based positioning system to determine a device's 400 location.

Figure 5:
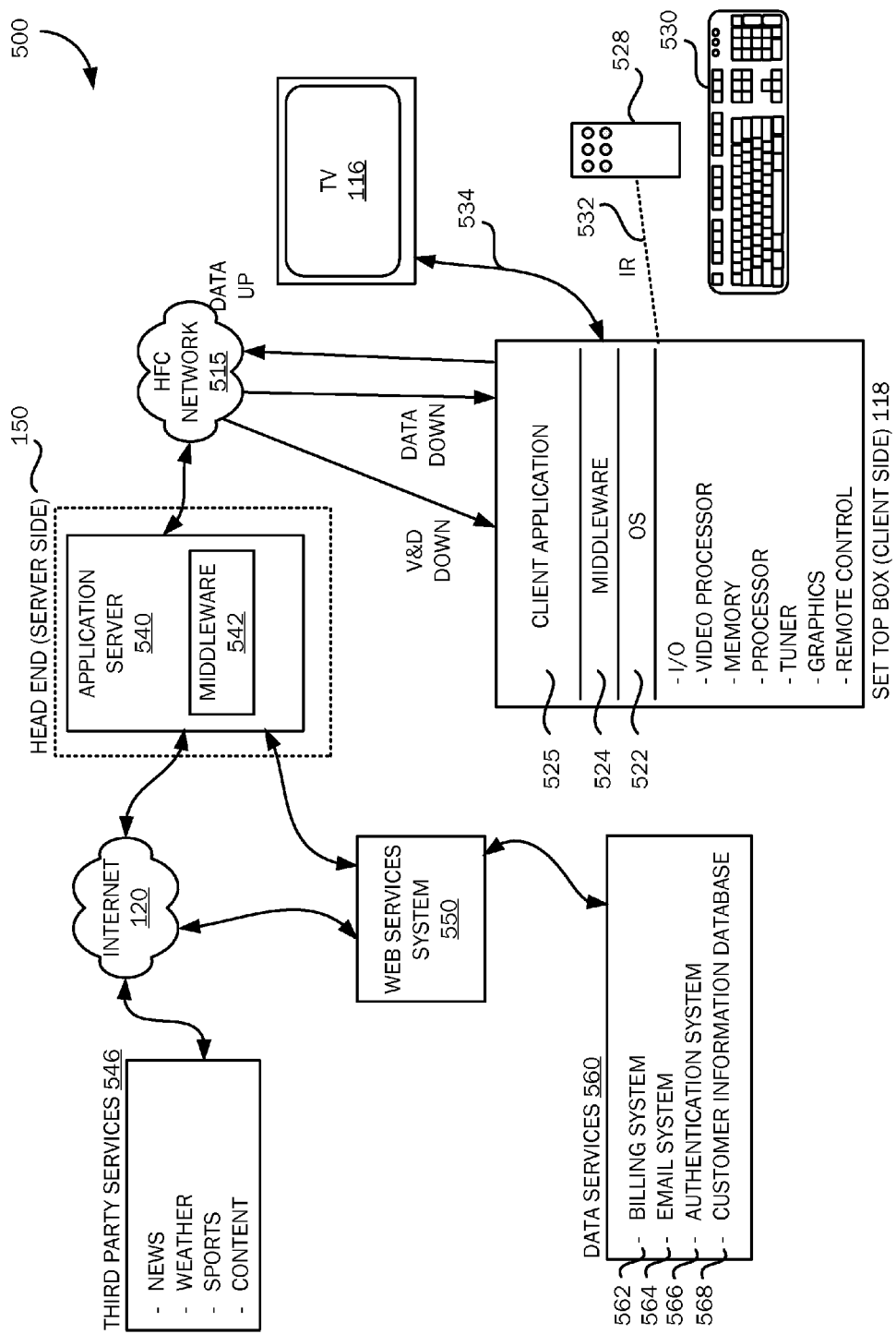
FIG. 5 is a simplified block diagram illustrating a cable television services system architecture providing an operating environment according to an embodiment.

FIG. 5 is a simplified block diagram illustrating a cable television services system 500 (hereafter referred to as "CATV") architecture providing an operating environment according to an embodiment. As can be appreciated, a CATV architecture is but one of various types of systems that may be utilized to provide personalized content based on presence. Referring now to FIG. 5, digital and analog video programming, information content and interactive television services are provided via a hybrid fiber coax (HFC) network 515 to a television set 116 for consumption by a cable television/services system customer. As is known to those skilled in the art, HFC networks 515 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 515 allows for efficient bidirectional data flow between the client-side set-top box 118 and a server-side application server 540.

The CATV system 500 is in the form of a distributed client-server computing system for providing video and data flow across the HFC network 515 between server-side services providers (e.g., cable television/services providers) via a server-side head end 150 and a client-side customer via a client-side set-top box (STB) 118 functionally connected to a customer receiving device, such as the television set 116. As is understood by those skilled in the art, modern CATV systems 500 may provide a variety of services across the HFC network 515 including traditional digital and analog video programming, telephone services, high speed Internet access, video-on-demand, and information services.

On the client side of the CATV system 500, digital and analog video programming and digital and analog data are provided to the customer television set 116 via the set-top box (STB) 118. Interactive television services that allow a customer to input data to the CATV system 500 likewise are provided by the STB 118. As illustrated in FIG. 5, the STB 118 is a multipurpose computing device having a computer processor, memory, and an input/output mechanism. The input/output mechanism receives input from server-side processes via the HFC network 515 and from customers via input devices such as the remote control device 528, keyboard 530, or other computing device, such as a tablet/slate computer 114, smart phone 110, etc. The remote control device 528 and the keyboard 530 may communicate with the STB 118 via a suitable communication transport such as the infrared connection 532. The STB 118 also includes a video processor for processing and providing digital and analog video signaling to the television set 116 via a cable communication transport 534. A multi-channel tuner is provided for processing video and data to and from the STB 118 and the server-side head end system 150, described below.

The STB 118 also includes an operating system 522 for directing the functions of the STB 118 in conjunction with a variety of client applications 525. For example, if a client application 525 requires a news flash from a third-party news source to be displayed on the television 116, the operating system 522 may cause the graphics functionality and video processor of the STB 118, for example, to output the news flash to the television 116 at the direction of the client application 525 responsible for displaying news items. According to embodiments, the operating system 522 may include one or more components of the personalization system 102 as described herein.

Because a variety of different operating systems 522 may be utilized by a variety of different brands and types of set-top boxes, a middleware layer 524 may be provided to allow a given software application to be executed by a variety of different operating systems. According to an embodiment, the middleware layer 524 may include a set of application programming interfaces (APIs) that are exposed to client applications 525 and operating systems 522 that allow the client applications to communicate with the operating systems through common data calls understood via the API set. As described below, a corresponding middleware layer is included on the server side of the CATV system 500 for facilitating communication between the server-side application server and the client-side STB 118. The middleware layer 542 of the server-side application server and the middleware layer 524 of the client-side STB 118 may format data passed between the client side and server side according to the Extensible Markup Language (XML).

According to one embodiment, the set-top box 118 passes digital and analog video and data signaling to the television 116 via a one-way communication transport 534. According to other embodiments, two-way communication transports may be utilized, for example, via high definition multimedia (HDMI) ports. The STB 118 may receive video and data from the server side of the CATV system 500 via the HFC network 515 through a video/data downlink and data via a data downlink. The STB 118 may transmit data from the client side of the CATV system 500 to the server side of the CATV system 500 via the HFC network 515 via one data uplink. The video/data downlink is an "in band" downlink that allows for digital and analog video and data signaling from the server side of the CATV system 500 through the HFC network 515 to the set-top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 5, between the HFC network 515 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 540 is typically passed through the "out of band" data links. Alternatively, an "in band" data carousel may be positioned in an "in band" channel into which a data feed may be processed from the server-side application server 540 through the HFC network 515 to the client-side STB 118. Operation of data transport between components of the CATV system 500, described with reference to FIG. 5, is well known to those skilled in the art.

Referring still to FIG. 5, the head end 150 of the CATV system 500 is positioned on the server side of the CATV system 500 and includes hardware and software systems responsible for originating and managing content for distributing through the HFC network 515 to client-side STBs 118 for presentation to customers via televisions 116. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set-top box 118 via the HFC network 515. As described above with reference to the set-top box 118, the application server 540 includes a middleware layer 542 for processing and preparing data from the head end of the CATV system 500 for receipt and use by the client-side set-top box 518. For example, the application server 540 via the middleware layer 542 may obtain data from third-party services 546 via the Internet 120 for transmitting to a customer through the HFC network 515 and the set-top box 118. For example, content metadata a third-party content provider service may be downloaded by the application server via the Internet 120. When the application server 540 receives the downloaded content metadata, the middleware layer 542 may be utilized to format the content metadata for receipt and use by the set-top box 118. Therefore, content metadata may be sent and categorized based on the availability to the customer's program guide data.

According to one embodiment, data obtained and managed by the middleware layer 542 of the application server 540 is formatted according to the Extensible Markup Language and is passed to the set-top box 118 through the HFC network 515 where the XML-formatted data may be utilized by a client application 525 in concert with the middleware layer 524, as described above. As should be appreciated by those skilled in the art, a variety of third-party services data, including news data, weather data, sports data and other information content may be obtained by the application server 540 via distributed computing environments such as the Internet 120 for provision to customers via the HFC network 515 and the set-top box 118.

According to embodiments, the application server 540 obtains customer support services data, including billing data, information on customer work order status, answers to frequently asked questions, services provider contact information, and the like from data services 560 for provision to the customer via an interactive television session. As illustrated in FIG. 5, the services provider data services 560 include a number of services operated by the services provider of the CATV system 500 which may include data on a given customer.

A billing system 562 may include information such as a customer's name, street address, business identification number, Social Security number, credit history, and information regarding services and products subscribed to by the customer. According to embodiments, the billing system 562 may also include billing data for services and products subscribed to by the customer for bill processing, billing presentment and payment receipt.

A customer information database 568 may include general information about customers such as place of employment, business address, business telephone number, and demographic information such as age, gender, educational level, and the like. The customer information database 568 may also include information on pending work orders for services or products ordered by the customer. The customer information database 568 may also include general customer information such as answers to frequently asked customer questions and contact information for various service provider offices/departments. As should be understood, this information may be stored in a variety of disparate databases operated by the cable services provider.

Referring still to FIG. 5, web services system 550 is illustrated between the application server 540 and the data services 560. According to embodiments, web services system 550 serves as a collection point for data requested from each of the disparate data services systems comprising the data services 560. According to embodiments, when the application server 540 requires customer services data from one or more of the data services 560, the application server 540 passes a data query to the web services system 550. The web services system formulates a data query to each of the available data services systems for obtaining any required data for a requesting customer as identified by a set-top box identification associated with the customer. The web services system 550 serves as an abstraction layer between the various data services systems and the application server 540. That is, the application server 540 is not required to communicate with the disparate data services systems, nor is the application server 540 required to understand the data structures or data types utilized by the disparate data services systems. The web services system 550 is operative to communicate with each of the disparate data services systems for obtaining necessary customer data. The customer data obtained by the web services system is assembled and is returned to the application server 540 for ultimate processing via the middleware layer 542, as described above.

An authentication system 566 may include information such as secure user names, subscriber profiles, subscriber IDs, and passwords utilized by customers for access to network services. As should be understood by those skilled in the art, the disparate systems 562, 564, 566, 568 may be integrated or provided in any combination of separate systems, wherein FIG. 5 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-5. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for automatically providing personalized content based on presence, the method comprising:
   identifying a group of users in a media consumption environment;
   determining if the identified group of users are known users;
   retrieving user information associated with the identified group of users when the identified group of users are known users;
   applying one or more certainty thresholds to control consumption of mixed-group content including a first threshold corresponding to a low certainty identification based on use of a single sensor to control consumption of a first type of content and a second threshold corresponding to a higher certainty identification based on use of multiple sensors to control consumption of a second type of content; and providing the mixed-group content to the identified group of users according to the one or more certainty thresholds and the retrieved user information associated with the identified group of users.

2. The method of claim 1, wherein when the identified group of users are not known users, determining default content to provide to the identified group of users.

3. The method of claim 1, further comprising identifying the group of users via one or more of:
   facial recognition;
   two-dimensional imaging;
   three-dimensional imaging;
   voice recognition;
   weight recognition;
   stride length recognition;
   radio frequency identification;
   mobile device recognition;
   personal portable computing device recognition; or
   user log in.

4. The method of claim 1, further comprising determining if user profile data is provided for one or for a combination of identified users.

5. The method of claim 4, further comprising querying a user profile data store for one or more of:
   personalization data;
   preference data;
   viewing history data; or
   demographic data.

6. The method of claim 1, further comprising applying prioritization rules according to the identified group of users to create a group preference specifically for a mixture of people in the media consumption environment.

7. The method of claim 1, further comprising applying blending rules to the user information associated with the identified group of users to create a group preference specifically for a mixture of people in the media consumption environment.

8. The method of claim 1, further comprising applying safety rules according to the identified group of users, wherein the safety rules control whether certain content viewership is not be allowed to occur including ceasing adult-type video content until a child is no longer detected in the media consumption environment.

9. The method of claim 1, further comprising providing personalized mixed-group content, wherein the personalized mixed-group content comprises one or more of:
   media content;
   media recommendations;
   advertisements; or
   display preferences.

10. The method of claim 1, further comprising monitoring and storing user behavior for the identified group of users, wherein the user behavior comprises one or more of:
    selected and consumed media content;
    ratings assigned by the user or group of users;
    changes in personalization settings;
    other observed feedback of one or more users of the identified group of users regarding-satisfaction/dissatisfaction with the mixed-group content.

11. The method of claim 1, further comprising:
    monitoring for changes in audience composition;
    identifying a user or a group of users in the media consumption environment;
    determining if the identified user or group of users are known users;
    if the identified user or group of users are known users, retrieving user information associated with the identified user or group of users; and
    determining the mixed-group content to provide to the identified user or group of users based on the retrieved user information associated with the identified user or group of users.

12. A system for providing personalized content based on presence, the system comprising:
    a memory storage;
    one or more sensors; and
    a processing unit coupled to the memory storage and the one or more sensors, wherein the processing unit is operable to:
       identify a group of users in a media consumption environment;
       determine if the identified group of users are known users;
       retrieve user information associated with the identified group of users when the identified group of users are known users;
       apply one or more certainty thresholds to control consumption of mixed-group content including a first threshold corresponding to a low certainty identification based on use of a single sensor to control consumption of a first type of content and a second threshold corresponding to a higher certainty identification based on use of multiple sensors to control consumption of a second type of content;
       provide the mixed-group content to the identified group of users according to the one or more certainty thresholds and the retrieved user information associated with the identified group of users, the mixed-group content comprising one or more of:
          media content;
          media recommendations;
          advertisements; or
          display preferences;
       monitor user behavior associated with the identified group of users;
       store user behavior data associated with the identified group of users; and
       monitor for changes in audience composition.

13. The system of claim 12, further configured to use the one or more sensors to identify the group of users in the media consumption environment.

14. The system of claim 13, wherein the one or more sensors comprise one or more of:
    a microphone;
    a camera;
    a pressure sensitive pad;
    a radio frequency identification system;
    a global positioning system;
    a wireless network triangulation system;
    a local device identifier;
    an application; or
    a user log in system.

15. The system of claim 12, wherein the processing unit is further operable to query a user profile data store to determine if user profile data is provided for the identified group of users, the user profile data comprising one or more of:
    personalization data;
    preference data;

viewing history data; or
demographic data.

16. The system of claim 12, wherein the processing unit is further operable to apply rules according to the identified group of users, the rules comprising one or more of:
prioritization rules;
blending rules; or
safety rules.

17. A non-transitory computer readable medium having computer-executable instructions for providing personalized content based on presence, comprising:
identifying a group of users in a media consumption environment;
determining if the identified group of users are known users;
retrieving user information associated with the identified group of users when the identified group of users are known users;
applying one or more certainty thresholds to control consumption of mixed-group content including a first threshold corresponding to a low certainty identification based on use of a single sensor to control consumption of a first type of content and a second threshold corresponding to a higher certainty identification based on use of multiple sensors to control consumption of a second type of content;
providing the mixed-group content to the identified group of users according to the one or more certainty thresholds and the retrieved user information associated with the identified group of users, the mixed-group content comprising one or more of:
media content;
media recommendations;
advertisements; or
display preferences;
monitoring user behavior associated with the identified group of users;
storing user behavior data associated with the identified group of users; and
monitoring for changes in audience composition.

18. The non-transitory computer readable medium of claim 17, further comprising applying rules according to the identified group of users, the rules comprising one or more of:
prioritization rules;
blending rules; or
safety rules.

19. The non-transitory computer readable medium of claim 17, further comprising identifying the group of users via one or more of:
facial recognition;
voice recognition;
weight recognition;
stride length recognition;
radio frequency identification;
mobile device recognition; or
user log in.

20. The non-transitory computer readable medium of claim 17, further comprising:
determining if user profile data is provided for one or for a combination of identified users; and
querying a user profile data store for one or more of:
personalization data;
preference data;
viewing history data; or
demographic data.

* * * * *